US012770436B2

(12) United States Patent
Yu

(10) Patent No.: US 12,770,436 B2
(45) Date of Patent: Oct. 20, 2026

(54) FACE ANTI-SPOOFING METHOD, DEVICE, AND COMPUTER-READABLE STORAGE MEDIUM

(71) Applicant: Black Sesame Technologies Co., Ltd., Wuhan (CN)

(72) Inventor: Huan Yu, Wuhan (CN)

(73) Assignee: Black Sesame Technologies Co., Ltd., Wuhan (CN)

( * ) Notice: Subject to any disclaimer, the term of this patent is extended or adjusted under 35 U.S.C. 154(b) by 255 days.

(21) Appl. No.: 18/398,067

(22) Filed: Dec. 27, 2023

(65) Prior Publication Data

US 2024/0212393 A1 Jun. 27, 2024

(30) Foreign Application Priority Data

Dec. 27, 2022 (CN) ........................ 202211684312.X

(51) Int. Cl.
*G06V 40/40* (2022.01)
*G06T 7/50* (2017.01)
*G06V 40/16* (2022.01)

(52) U.S. Cl.
CPC ................ *G06V 40/45* (2022.01); *G06T 7/50* (2017.01); *G06V 40/171* (2022.01);
(Continued)

(58) Field of Classification Search
CPC ............. G06T 2207/10028; G06T 7/50; G06T 2207/30201; G06V 40/45; G06V 40/40; G06V 40/172; G06V 40/171
See application file for complete search history.

(56) References Cited

U.S. PATENT DOCUMENTS

2012/0069007 A1* 3/2012 Pegg .................... H04N 13/128 345/419
2021/0082136 A1* 3/2021 Nikitidis ............... B29C 64/393
(Continued)

FOREIGN PATENT DOCUMENTS

CN 108388889 A * 8/2018 ............. G06F 18/22
CN 109325472 2/2019
(Continued)

OTHER PUBLICATIONS

Yu et al., "Revisiting Pixel-Wise Supervision for Face Anti-Spoofing," cs.CV, Submitted on Nov. 24, 2020, arXiv:2011.12032v1, 10 pages.
(Continued)

*Primary Examiner* — Jennifer Mehmood
*Assistant Examiner* — Soumya Thomas
(74) *Attorney, Agent, or Firm* — Fish & Richardson P.C.

(57) ABSTRACT

A face anti-spoofing method, device, and computer-readable storage medium are provided, the method includes: extracting features from a face image; calculating an anti-spoofing analysis result of the face image in a predetermined manner based on the features of the face image; performing a feature visualization process on the features of the face image to obtain a first three-dimensional depth image; comparing the first three-dimensional depth image with a pre-generated second three-dimensional depth image corresponding to the face image; and adjusting the anti-spoofing analysis result based on the comparison result, and determining whether or not the face image is from a living body according to the adjusted anti-spoofing analysis result.

20 Claims, 3 Drawing Sheets

(52) U.S. Cl.
CPC .. *G06V 40/172* (2022.01); *G06T 2207/10028* (2013.01); *G06T 2207/30201* (2013.01)

(56) References Cited

U.S. PATENT DOCUMENTS

| | | | | |
|---|---|---|---|---|
| 2021/0110018 | A1 * | 4/2021 | Rowe | G06V 10/764 |
| 2021/0150240 | A1 * | 5/2021 | Yu | G06N 3/09 |
| 2022/0270360 | A1 * | 8/2022 | Mendlovic | G06V 40/40 |

FOREIGN PATENT DOCUMENTS

| | | | | | |
|---|---|---|---|---|---|
| CN | 110674759 | | | 1/2020 | |
| CN | 110688950 | | | 1/2020 | |
| CN | 110807448 | A | * | 2/2020 | G06N 3/08 |
| CN | 111507131 | A | * | 8/2020 | G06V 40/45 |
| CN | 112348069 | A | * | 2/2021 | G06F 18/214 |
| CN | 112418865 | | | 2/2021 | |
| CN | 112926498 | | | 6/2021 | |
| CN | 113553887 | A | | 10/2021 | |
| CN | 114220147 | A | | 3/2022 | |
| CN | 114581569 | A | * | 6/2022 | G06N 3/045 |
| CN | 114677722 | | | 6/2022 | |
| CN | 115131880 | | | 9/2022 | |
| CN | 115439906 | A | | 12/2022 | |
| CN | 115984978 | | | 4/2023 | |
| SG | 10202002506 | | * | 9/2022 | G06F 18/22 |
| WO | WO-2008119368 | A1 | * | 10/2008 | G06V 40/193 |

OTHER PUBLICATIONS

Yu et al., "Searching Central Difference Convolutional Networks for Face Anti-Spoofing," Presented at 2020 IEEE/CVF Conference on Computer Vision and Pattern Recognition (CVPR), Seattle, WA, Jun. 13-19, 2020; IEEE, Aug. 5, 2020, pp. 5295-5305.
Office Action in Chinese Appln. No. 202211684312.X, mailed on Dec. 24, 2025, 17 pages (with English translation).

* cited by examiner

FACE ANTI-SPOOFING METHOD, DEVICE, AND COMPUTER-READABLE STORAGE MEDIUM

CROSS-REFERENCE TO RELATED APPLICATION

This application claims the benefit under 35 U.S.C. § 119(a) of the filing date of Chinese Patent Application No. 202211684312.X, filed in the Chinese Patent Office on Dec. 27, 2022. The disclosure of the foregoing application is herein incorporated by reference in its entirety.

FIELD

Embodiments of the present disclosure relate to the computer technologies field, and, more particularly, a face anti-spoofing method, device, and computer-readable storage medium.

BACKGROUND

With the wide application of face recognition, face unlocking, face payment, and other technologies in finance, access control, mobile devices, and other daily life, face anti-spoofing/liveness detection technology has gained more and more attention in recent years.

The face anti-spoofing technology is mainly used to determine whether the face appearing in front of the machine is real or fake, wherein any face presented with the help of other media can be defined as a fake face, including printed paper photographs, display screens of electronic products, silicone masks, and 3D (three-dimensional) portraits.

Currently, mainstream face anti-spoofing solutions are categorized into cooperative anti-spoofing and non-cooperative anti-spoofing (silent anti-spoofing detection). Cooperative anti-spoofing requires the user to complete specified actions in response to a prompt, and then the anti-spoofing is performed. Cooperative anti-spoofing uses face key points and face tracking technology through a combination of cooperative actions such as eyes blinking, mouth opening, head shaking, head nodding, etc., wherein the ratio of the changed distance to the unchanged distance is calculated through consecutive images and the image of the previous frame and the image of the next frame is compared, to verify that whether the user is a real live person or not. Silent anti-spoofing performs liveness verification directly without the user's senses. Silent anti-spoofing does not require the user to perform additional actions, and directly screens paper photos, screen images, face masks and other fake face attacks based on algorithms. Compared with cooperative anti-spoofing, silent anti-spoofing detection has a better user experience and works faster, which can directly perform anti-spoofing in a senseless way. In actual use, the scheme can be selected according to the specific scenario, such as gates, access control, ticket inspection, and other scenarios requiring higher detection speed, silent anti-spoofing is generally recommended.

The main technical problems of the anti-spoofing in existing techniques lie in that the detection accuracy is not high, and the present disclosure aims to provide a new anti-spoofing technical solution that can significantly improve liveness detection accuracy.

SUMMARY

A face anti-spoofing method, device, and computer-readable storage medium is provided in the embodiments of the present disclosure, to solve or at least partially solve the liveness detection accuracy problem in existing techniques.

In an embodiment of the present disclosure, a face anti-spoofing method is provided, comprising: extracting features from a face image; calculating an anti-spoofing result of the face image in a pre-determined manner based on the features of the face image; performing a feature visualization process on the features of the face image to obtain a first three-dimensional depth image; comparing the first three-dimensional depth image with a pre-generated second three-dimensional depth image corresponding to the face image; and adjusting the anti-spoofing analysis result based on the comparison result, and determining whether or not the face image is from a living body according to the adjusted anti-spoofing analysis result.

In some embodiments, before said extracting features from a face image, the method further comprises: performing face recognition on the face image, and drawing a first box in the face image according to the recognition result; processing the first box to obtain a second box according to a predetermined expansion ratio; said extracting features from a face image further includes: extracting the features from a region of the face image located within the second box.

In some embodiments, said processing the first box to obtain a second box according to a predetermined expansion ratio comprises: generating a square third box based on the short side of the first box; enlarging the third box according to the expansion ratio to obtain the second box.

In some embodiments, before said comparing the first three-dimensional depth image with a pre-generated second three-dimensional depth image corresponding to the face image, the method further comprises: generating the second three-dimensional depth image based on a region of the face image located within the second box.

In some embodiments, said generating a second three-dimensional depth image comprises: generating a binary rectangular mask based on the first box; calculating a second position of the binary rectangular mask in the second three-dimensional depth image based on the first position of the first box in the face image; and processing the second three-dimensional depth image with the binary rectangular mask based on the second position.

In some embodiments, said processing the second three-dimensional depth image with the binary rectangular mask comprises: setting the areas covered by the binary rectangular mask in the second three-dimensional depth image to 1, and setting the uncovered areas to 0.

In some embodiments, said comparing the first three-dimensional depth image with a pre-generated second three-dimensional depth image corresponding to the face image comprises: calculating a difference between the first three-dimensional depth image and the second three-dimensional depth image; and said adjusting the anti-spoofing analysis result based on the comparison result comprises: setting a weight based on the difference between the first three-dimensional depth image and the second three-dimensional depth image, and adjusting the anti-spoofing analysis result.

In some embodiments, said calculating an anti-spoofing analysis result of the face image in a predetermined manner comprises: using the sigmoid function to calculate the anti-spoofing analysis result.

In an embodiment of the present disclosure, a face anti-spoofing detection device is provided, comprising: a feature extraction module for extracting features from a face image; a face analysis module for calculating an anti-spoofing analysis result of the face image in a predetermined manner based on the features of the face image; a feature visualization module for performing a feature visualization process on the features of the face image to obtain a first three-dimensional depth image; a comparison module for comparing the first three-dimensional depth image with a pre-generated second three-dimensional depth image corresponding to the face image; and a result adjustment module for adjusting the anti-spoofing analysis result based on the comparison result, and determining whether or not the face image is from a living body according to the adjusted anti-spoofing analysis result.

In an embodiment of the present disclosure, a computer-readable storage medium having a plurality of instructions stored thereon is provided, the instructions being adapted to be loaded and run by a processor to perform any one of the face anti-spoofing methods provided in the above embodiments.

One or more of the above embodiments of the present disclosure have at least one or more of the following beneficial effects:

Unlike the technical solutions in existing techniques, in the embodiments of the present disclosure, after the anti-spoofing analysis is performed based on the features of the face image and the results are obtained, it does not directly determine whether the face image is from a living body or not, but instead the feature visualization technique is used to generate a three-dimensional depth image at the feature extraction stage, which is compared to a pre-generated real three-dimensional depth image matched with the face image. If the two images are similar to each other, the comparison could indicate that the extracted features can better reflect the three-dimensionality of the face, and more accurate detection results can be obtained for liveness detection. However, if the difference between the two images is greater, the difference could indicate that the extracted features cannot accurately reflect the three-dimensionality of the face, and it could be difficult to obtain more accurate detection results for liveness detection. The embodiments of the present disclosure actually use the depth image as supervisory information to ensure that accurate liveness detection results can be obtained.

BRIEF DESCRIPTION OF THE DRAWINGS

Referring to the drawings, the present disclosure will be easier to understand. It will be readily understood by those skilled in the art that these drawings are used for illustrative purposes only and are not intended to limit the protection scope of the present disclosure. Wherein.

DETAILED DESCRIPTION OF EMBODIMENTS

The technical solutions provided by embodiments of the present disclosure are described below with reference to the drawings. It should be understood by those skilled in the art that these embodiments are used only to explain the technical principles of the present disclosure and are not intended to limit the protection scope of the present disclosure.

In the description of the present disclosure, "module" or "processor" may include hardware, software, or a combination thereof. A module may include hardware circuitry, various suitable sensors, communication ports, memory, a software component, such as instructions, or a combination of software and hardware. The processor may be a central processor, a microprocessor, an image processor, a digital signal processor, or any other suitable processor. The processor has data and/or signal processing capabilities. The processor may be implemented in software, hardware, or a combination. A non-transitory computer-readable storage medium includes any suitable medium for storing instructions, such as a diskette, a hard disk, a CD-ROM, a flash memory, a read-only memory, a random-access memory, and the like. The term "A and/or B" denotes all possible combinations of A and B, such as just A, just B, or A and B. The term "at least one A or B" or "at least one of A and B" has the same meaning as "at least one A or B". The terms "at least one A or B" or "at least one of A and B" are similar to "A and/or B" and can include just A, just B, or A and B. The singular forms of the terms "a", "this", and "the" can also include plural forms.

Figure 1:
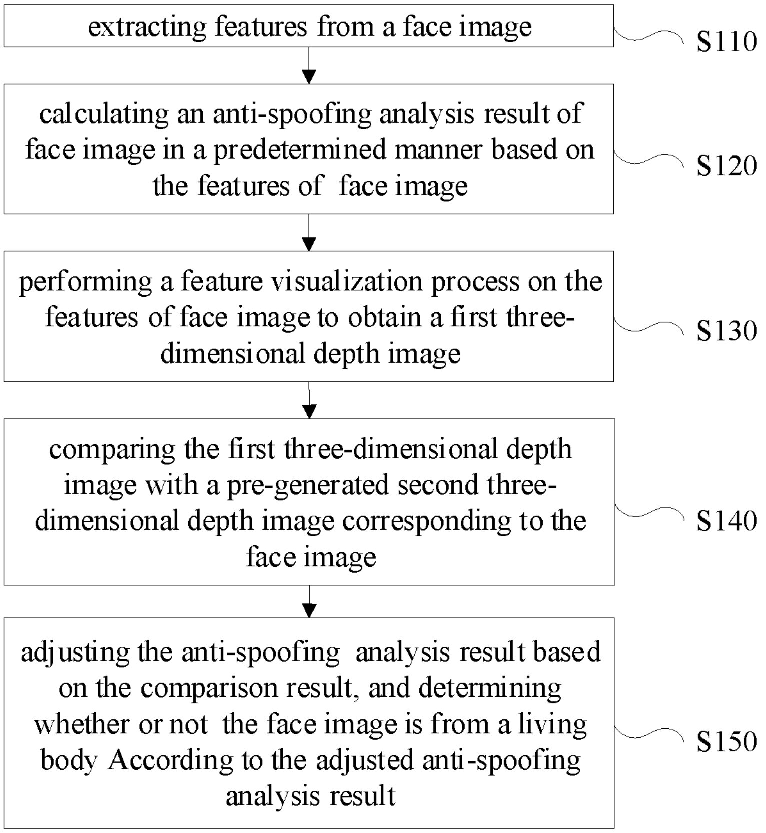
FIG. 1 is a schematic flow chart of a face anti-spoofing method according to an embodiment of the present disclosure.

As shown in FIG. 1, a face anti-spoofing method is provided according to an embodiment of the present disclosure, which includes the following steps.

In S110, the features are extracted from a face image.

In the present embodiment, the face image is usually an RGB (a type of color standard) image.

In S120, an anti-spoofing analysis result of the face image is calculated in a predetermined manner based on the features of the face image.

In the present embodiment, a model which is formed as a combination of several stacked CNN (Convolutional Neural Network) modules is used to extract features from the face image. The model can keep the model structure and the number of parameters small so as to be fast and good.

In S130, a feature visualization process is performed on the features of the face image to obtain the first three-dimensional depth image.

In the present embodiment, a feature visualization module is preset to generate a 3D depth image (i.e., the first three-dimensional depth image) corresponding to the features by feature visualization technique (a technique in the deep learning field).

In S140, the first three-dimensional depth image is compared with the pre-generated second three-dimensional depth image corresponding to the face image.

In the present embodiment, the real 3D depth image matched with the face image is used as the supervisory information. In the present embodiment, the depth image obtained by feature visualization is compared with the supervisory depth image, and the smaller the differences, the better the extracted features; on the contrary, the larger the differences, the worse the extracted features.

In S150, the anti-spoofing analysis result is adjusted based on the comparison result, and whether or not the face image is from a living body is determined according to the adjusted anti-spoofing analysis result.

According to the technical solution of the present embodiment, after the anti-spoofing analysis is performed based on the features of the face image and the results are obtained. The described technique does not directly determine whether the face image is from a living body or not, but instead the feature visualization technique is used to generate a three-dimensional depth image at the feature extraction stage, which is compared to a pre-generated real three-dimensional depth image matched with the face image. If the two images are similar to each other, the comparison could indicate that the extracted features can better reflect the three-dimensionality of the face, and more accurate detection results can be obtained for liveness detection. However, if the difference between the two images is greater, the difference could indicate that the extracted features cannot accurately reflect the three-dimensionality of the face, and it could be difficult to obtain more accurate detection results for liveness detection. The embodiments of the present disclosure actually use the depth image as supervisory information to ensure that accurate liveness detection results can be obtained.

Figure 2:
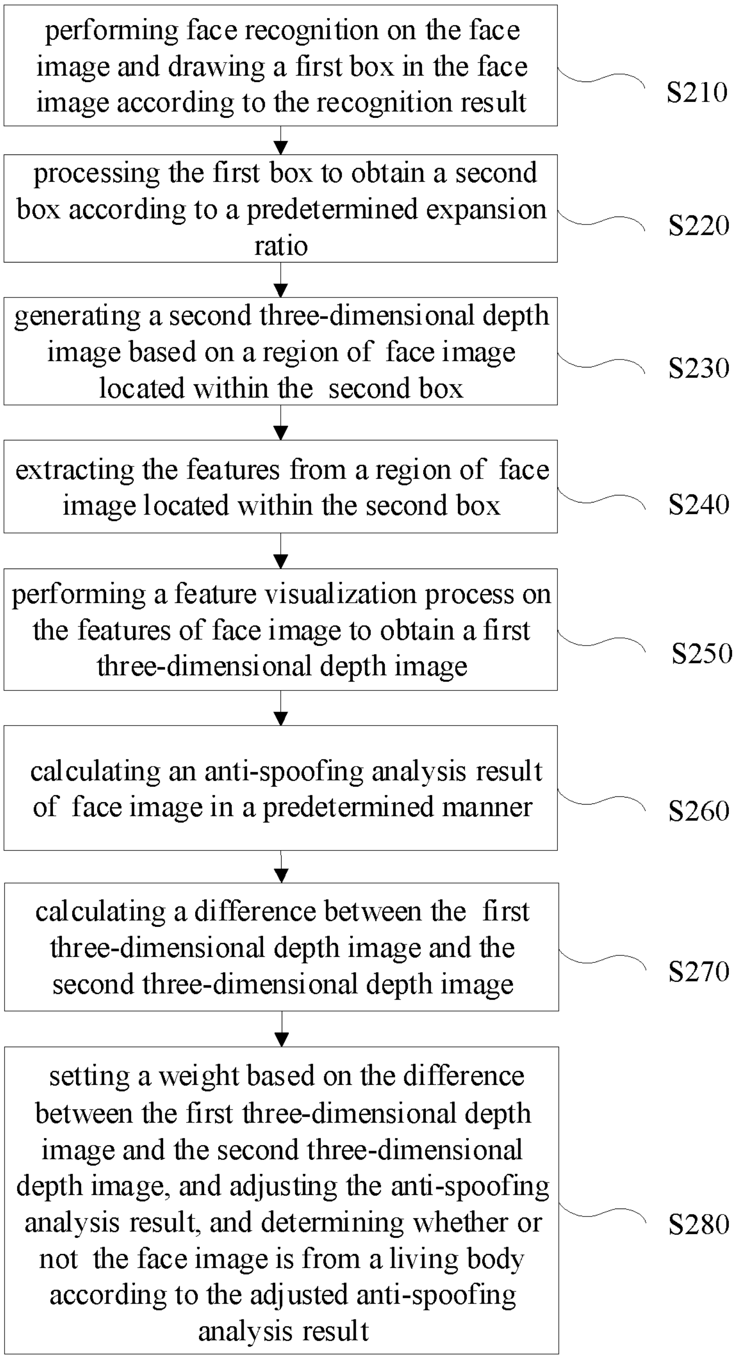
FIG. 2 is a schematic flow chart of a face anti-spoofing method according to an embodiment of the present disclosure.

As shown in FIG. 2, a face anti-spoofing method is provided according to an embodiment of the present disclosure, which includes the following steps.

In S210, face recognition is performed on the face image, and a first box is drawn in the face image according to the recognition result.

In the present embodiment, face detection is performed on the face image, and the Bounding box (bbox_1), i.e., the first box, is obtained, and its coordinate information is determined. The bbox_1 obtained by face detection contains only the five sense organs of the face.

In S220, the first box is processed to obtain the second box according to a predetermined expansion ratio. Specifically, The described technique generates the square third box based on the short side of the first box; and enlarges the third box according to the expansion ratio to obtain the second box.

In the present embodiment, the short side of bbox-1 is taken to form a square bbox_2 (to avoid distorting the face when changing the face size), i.e., the third box, and then an expansion ratio scale_size is set, e.g., scale_size=2.7. The cropped face will be larger than the original bbox_1, and it will be able to completely cover the face, while having a bit of background information.

In S230, the second three-dimensional depth image is generated based on a region of the face image located within the second box.

Specifically, a binary rectangular mask is generated based on the first box. The second position of the binary rectangular mask in the second three-dimensional depth image is calculated based on the first position of the first box in the face image. The second three-dimensional depth image is processed with the binary rectangular mask based on the second position, and the areas covered by the binary rectangular mask in the second three-dimensional depth image are set to 1, while the uncovered areas are set to 0.

In the present embodiment, a face 3D depth model is preset and trained to generate a corresponding 3D depth image based on the face image. In the present embodiment, a binary rectangular mask is generated based on bbox_1, and the position of the binary rectangular mask in the 3D depth image is determined based on the coordinates of bbox_1. The portion outside the binary rectangular mask is taken as background and set to 0, and the portion covered by the binary rectangular mask is set to 1.

In S240, the features are extracted from a region of the face image that is located within the second box.

In S250, a feature visualization process is performed on the features of the face image, to obtain the first three-dimensional depth image.

In S260, an anti-spoofing analysis result of the face image is calculated in a predetermined manner. Specifically, the sigmoid function is used to calculate the anti-spoofing analysis result.

In S270, the difference between the first three-dimensional depth image and the second three-dimensional depth image is calculated.

In S280, the weight is set based on the difference between the first three-dimensional depth image and the second three-dimensional depth image, and the anti-spoofing analysis result is adjusted. Whether the face image is from a living body or not is determined according to the adjusted anti-spoofing analysis result In the present embodiment, a 1×1 feature map is generated based on the extracted features, and then a score (i.e., the anti-spoofing analysis result) from 0 to 1 is generated by the sigmoid function. The difference(depth_diff) between the actual 3D depth image (the second 3D depth image) and the generated 3D depth image (the first 3D depth image) is calculated. Then the score_weight (weight)=1−depth_diff is taken, and the final score (adjusted anti-spoofing analysis result)=score_weight×score, such that the score is corrected based on the score_weight generated from the 3D depth supervisory information. In the present embodiment, the 3D depth image is actually taken as the supervisory information to correct the face anti-spoofing result.

In the technical solution of the present embodiment, an unimodal silent anti-spoofing scheme based on RGB face images is designed, which can achieve a very fast processing speed while the face anti-spoofing effectively defends against the conventional attacks.

Figure 3:
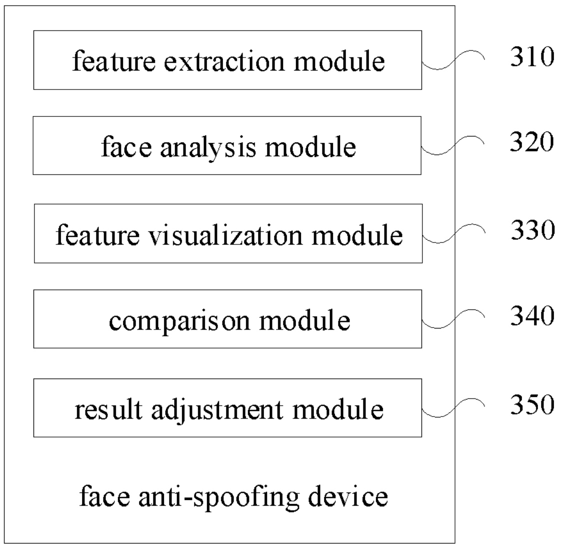
FIG. 3 is a schematic block diagram of a face anti-spoofing device according to an embodiment of the present disclosure.

As shown in FIG. 3, a face anti-spoofing device is provided according to an embodiment of the present disclosure, comprising:

A feature extraction module 310 is configured to extract features from the face image.

In the present embodiment, the face image is usually an RGB (a type of color standard) image.

A face analysis module 320 is configured to calculate the anti-spoofing analysis result of the face image in a predetermined manner based on the features of the face image.

In the present embodiment, a model that is formed as a combination of several stacked CNN (Convolutional Neural Network) modules is used to extract features from the face image. The model can keep the model structure and the amount of parameters small, so as to be fast and good.

A feature visualization module 330 is configured to perform the feature visualization process on the features of the face image to obtain a first three-dimensional depth image.

In the present embodiment, a feature visualization module is preset to generate a 3D depth image (i.e., the first three-dimensional depth image) corresponding to the features by feature visualization technique (a technique in the deep learning field).

A comparison module 340 is configured to compare the first three-dimensional depth image with the pre-generated second three-dimensional depth image corresponding to the face image.

In the embodiment, the real 3D depth image matched with the face image is used as the supervisory information. In the present embodiment, the depth image obtained by feature visualization is compared with the supervised depth image, and the smaller the differences, the better the extracted features; on the contrary, the larger the differences, the worse the extracted features.

A result adjustment module S350 is configured to adjust the anti-spoofing analysis result based on the comparison result, and determine whether or not the face image is from a living body according to the adjusted anti-spoofing analysis result.

According to the technical solution of the present embodiment, after the anti-spoofing analysis is performed based on the features of the face image and the results are obtained, the described technique does not directly determine whether the face image is from a living body or not, but instead the feature visualization technique is used to generate a three-dimensional depth image at the feature extraction stage, which is compared to a pre-generated real three-dimensional depth image matched with the face image. If the two images are similar to each other, the comparison could indicate that the extracted features can better reflect the three-dimensionality of the face, and more accurate detection results can be obtained for liveness detection. However, if the difference between the two images is greater, the difference could indicate that the extracted features cannot accurately reflect the three-dimensionality of the face, and it could be difficult to obtain more accurate detection results for liveness detection. The embodiments of the present disclosure actually use the depth image as supervisory information to ensure that accurate liveness detection results can be obtained.

Figure 4:
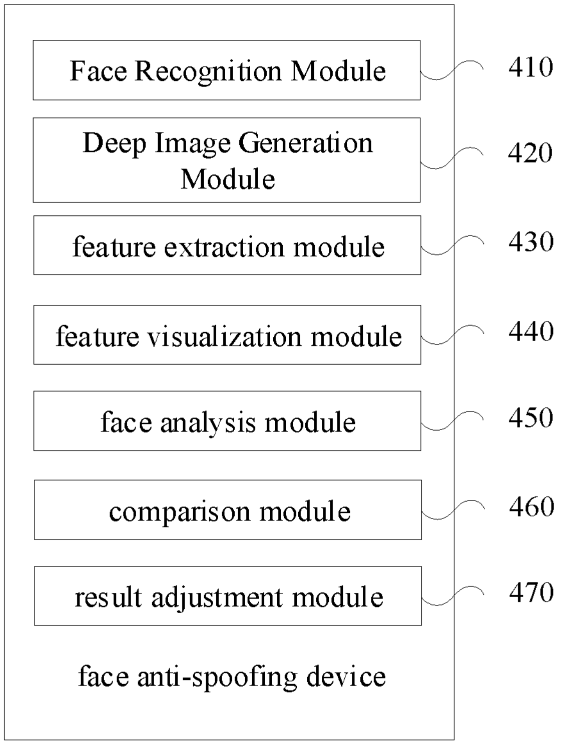
FIG. 4 is a schematic block diagram of a face anti-spoofing device according to an embodiment of the present disclosure.

As shown in FIG. 4, a face anti-spoofing device is provided according to an embodiment of the present disclosure, comprising:

A face recognition module 410 is configured to perform face recognition on the face image, and drawing the first box in the face image according to the recognition result.

In the present embodiment, face detection is performed on the face image, and the Bounding box (bbox_1), i.e., the first box, is obtained, and its coordinate information is determined. The bbox_1 obtained by face detection contains only the five sense organs of the face.

The face recognition module 410 is configured to processes the first box to obtain a second box according to a predetermined expansion ratio. Specifically, the face recognition module 410 generates the square third box based on the short side of the first box; and enlarges the third box according to the expansion ratio to obtain the second box.

In the present embodiment, the short side of bbox-1 is taken to form a square bbox_2 (to avoid distorting the face when changing the face size), i.e., the third box, and then an expansion ratio scale_size is set, e.g., scale_size=2.7. The cropped face will be larger than the original bbox_1, and it will be able to completely cover the face, while having a bit of background information.

A deep image generation module 420 for generating the second three-dimensional depth image based on a region of the face image located within the second box.

Specifically, the binary rectangular mask is generated based on the first box. The second position of the binary rectangular mask in the second three-dimensional depth image is calculated based on the first position of the first box in the face image. The second three-dimensional depth image is processed with the binary rectangular mask based on the second position, and the areas covered by the binary rectangular mask in the second three-dimensional depth image are set to 1, while the uncovered areas are set to 0.

In the present embodiment, a face 3D depth model is preset and trained to generate the corresponding 3D depth image based on the face image. In the present embodiment, the binary rectangular mask is generated based on bbox_1, and the position of the binary rectangular mask in the 3D depth image is determined based on the coordinates of bbox_1. The portion outside the binary rectangular mask is taken as background and set to 0, and the portion covered by the binary rectangular mask is set to 1.

A feature extraction module 430 is configured to extract the features from a region of the face image located within the second box.

A feature visualization module 440 is configured to perform a feature visualization process on the features of the face image to obtain a first three-dimensional depth image.

A face analysis module 450 is configured to calculate the anti-spoofing analysis result of the face image in a predetermined manner. Specifically, the sigmoid function is used to calculate the results of the anti-spoofing analysis result.

A comparison module 460 is configured to calculate the difference between the first three-dimensional depth image and the second three-dimensional depth image.

A result adjustment module 470 is configured to set the weight based on the difference between the first three-dimensional depth image and the second three-dimensional depth image, and adjust the anti-spoofing analysis result.

In the present embodiment, a 1×1 feature map is generated based on the extracted features, and then a score (i.e., the anti-spoofing analysis result) from 0 to 1 is generated by a sigmoid function. The difference(depth_diff) between the actual 3D depth image (the second 3D depth image) and the generated 3D depth image (the first 3D depth image) is calculated. Then the score_weight (weight)=1−depth_diff is taken, and the final score (adjusted anti-spoofing analysis result)=score_weight×score, such that the score is corrected based on the score_weight generated from the 3D depth supervisory information. In the present embodiment, the 3D depth image is actually taken as the supervisory information to correct the face anti-spoofing result.

In the technical solution of this embodiment, an unimodal silent anti-spoofing scheme based on RGB face images is designed, which can achieve a very fast processing speed while the face anti-spoofing effectively defends against the conventional attacks.

A computer-readable storage medium is provided by the present disclosure. In an embodiment of the present disclosure, the computer-readable storage medium may be configured to store instructions for performing the face anti-spoofing method provided in any one of the above-mentioned embodiments, wherein the instructions are adapted to be loaded and run by a processor to perform any one of the face anti-spoofing methods above-mentioned. For ease of illustration, only portions related to the embodiments of the present disclosure are shown, and where specific technical details are not disclosed, reference is made to the method portion of the embodiments of the present disclosure. The computer-readable storage medium may be a storage device apparatus including a storage device apparatus formed by various electronic devices, and optionally, the computer-readable storage medium in the embodiments of the present disclosure is a non-transitory computer-readable storage medium.

The algorithms and displays provided herein are not inherently associated with any particular computer, virtual system, or other device. Various general systems may also be used with the demonstrations based herein. The structures required to construct such systems are apparent in the above description. Moreover, the present disclosure is not directed to any particular programming language. It should be appreciated that a variety of programming languages may be utilized to implement the elements of the present disclosure described herein, and the descriptions given above with respect to particular languages are intended to disclose the best embodiments of the present disclosure.

In the specification provided herein, many specific details are described. However, it is to be understood that embodiments of the present disclosure may be practiced without these specific details. In some embodiments, known methods, structures, and techniques are not shown in detail to not obscure the understanding of the present specification.

Similarly, it should be understood that to streamline the present disclosure and aid in the understanding of one or more of the various inventive aspects, in the description of the exemplary embodiments of the present disclosure above, the various features of the present disclosure have sometimes been grouped together in individual embodiments, figures, or descriptions thereof. However, the methods of the disclosure should not be construed as reflecting an intent that the present disclosure claimed for protection requires more features than those expressly documented in each claim. Accordingly, the claims that follow a specific embodiment are hereby expressly incorporated into that specific embodiment, wherein each claim itself serves as a separate embodiment of the disclosure.

Those skilled in the art will appreciate that modules in the devices of the embodiments can be adaptively changed and set in one or more devices different from the embodiments. It is possible to combine the modules, units, or components of the embodiments into a single module, unit, or component, in addition to dividing them into a plurality of sub-modules, sub-units, or sub-assemblies. In addition to the fact that at least some of such features and/or processes or units are mutually exclusive, any combination of all features disclosed in this specification (including accompanying claims, abstracts, and accompanying drawings) and all processes or units of any method or apparatus so disclosed may be employed. Unless otherwise expressly stated, each feature disclosed in this specification (including the accompanying claims, abstract, and accompanying drawings) may be replaced by an alternative feature that provides the same, equivalent, or similar purpose.

In addition, those skilled in the art can appreciate that although some embodiments described herein include some features included in other embodiments and not others, combinations of features of different embodiments are meant to be within the scope of the present disclosure and form different embodiments. For example, in the following claims, any one of the embodiments may be used in any combination.

Various component embodiments of the present disclosure may be implemented in hardware, or software modules running on one or more processors, or in combinations thereof. It should be appreciated by those skilled in the art that a microprocessor or a digital signal processor (DSP) may be used in practice to implement some or all of the functionality of some or all of the components of a processing device of a mobile terminal according to embodiments of the present disclosure. The present disclosure may also be implemented as an apparatus or device program (e.g., a computer program and a computer program product) for performing some or all of the methods described herein. Such instructions for implementing the present disclosure may be stored on a computer-readable medium or may have the form of one or more signals. Such signals may be downloaded from an Internet site, provided on a carrier signal, or provided in any other form.

It should be noted that the above embodiments illustrate the present disclosure rather than limit the present disclosure and that those skilled in the art may devise replacement embodiments without departing from the scope of the appended claims. In the claims, any reference between brackets should not be construed as a limitation of the claims. The term "comprising" or "including" does not exclude the existence of elements or steps not listed in the claims. The term "one," "a," or "the" before an element does not exclude the existence of a plurality of such elements. The present disclosure can be implemented with the aid of hardware comprising a number of different elements and a suitably programmed computer. In the unitary claims enumerating a number of devices, several of these devices may be specified by means of the same hardware item. The term "first," "second," or "third," etc., does not indicate any order. These terms may be construed as names.

What is claimed is:

1. A face anti-spoofing method, comprising:

determining a first bounding box for a face image based on a recognition result predicted for the face image, generating a square bounding box from the first bounding box as a third bounding box such that the square bounding box has the same length as a short side of the first bounding box, expanding the square bounding box based on a predetermined expansion ratio to generate a second bounding box, extracting facial features from a region of the face image bounded by the second bounding box;

calculating an anti-spoofing analysis result of the face image in a predetermined manner based on the facial features of the face image;

performing a feature visualization process on the facial features of the face image to obtain a first three-dimensional depth image;

determining a comparison result by comparing the first three-dimensional depth image with a pre-generated second three-dimensional depth image corresponding to the face image; and adjusting the anti-spoofing analysis result based on the comparison result, and determining whether or not the face image is from a living body according to the adjusted anti-spoofing analysis result.

2. The method according to claim 1, before extracting the facial features from the face image, the method further comprises:

generating the recognition result by performing face recognition on the face image; and generating the first bounding box in the face image according to the recognition result.

3. The method according to claim 2, wherein the first bounding box consists of features that comprise one or more of (i) one or more eyes, (ii) a nose, (iii) a mouth, or (iv) one or more ears.

4. The method according to claim 2, before comparing the first three-dimensional depth image with the pre-generated second three-dimensional depth image corresponding to the face image, the method further comprises:

generating the second three-dimensional depth image based on a region of the face image located within the second bounding box.

5. The method according to claim 4, wherein generating the second three-dimensional depth image comprises:

generating a binary rectangular mask based on the first bounding box;

calculating a second position of the binary rectangular mask in the second three-dimensional depth image based on the first position of the first bounding box in the face image; and processing the second three-dimensional depth image with the binary rectangular mask based on the second position.

6. The method according to claim 5, wherein processing the second three-dimensional depth image with the binary rectangular mask comprises:

setting area covered by the binary rectangular mask in the second three-dimensional depth image to 1, and setting area uncovered by the binary rectangular mask in the second three-dimensional depth image to 0.

7. The method according to claim 1, wherein comparing the first three-dimensional depth image with the pre-generated second three-dimensional depth image corresponding to the face image comprises:

calculating a difference between the first three-dimensional depth image and the second three-dimensional depth image;

wherein adjusting the anti-spoofing analysis result based on the comparison result comprises:

setting a weight based on the difference between the first three-dimensional depth image and the second three-dimensional depth image, and adjusting the anti-spoofing analysis result.

8. The method according to claim 1, wherein calculating the anti-spoofing analysis result of the face image in the predetermined manner comprises:

using a sigmoid function to calculate the anti-spoofing analysis result.

9. One or more computer-readable storage media comprising a plurality of instructions stored thereon, the instructions being adapted to be loaded and run by a processor to perform operations, the operations comprising:

determining a first bounding box for a face image based on a recognition result predicted for the face image, generating a square bounding box from the first bounding box as a third bounding box such that the square bounding box has the same length as a short side of the first bounding box, expanding the square bounding box based on a predetermined expansion ratio to generate a second bounding box, extracting facial features from a region of the face image bounded by the second bounding box;

calculating an anti-spoofing analysis result of the face image in a predetermined manner based on the facial features of the face image;

performing a feature visualization process on the facial features of the face image to obtain a first three-dimensional depth image;

determining a comparison result by comparing the first three-dimensional depth image with a pre-generated second three-dimensional depth image corresponding to the face image; and adjusting the anti-spoofing analysis result based on the comparison result, and determining whether or not the face image is from a living body according to the adjusted anti-spoofing analysis result.

10. The one or more computer-readable storage media according to claim 9, before extracting the facial features from the face image, the method further comprises:

generating the recognition result by performing face recognition on the face image; and generating the first bounding box in the face image according to the recognition result.

11. The one or more computer-readable storage media according to claim 10, wherein the first bounding box consists of features that comprise one or more of (i) one or more eyes, (ii) a nose, (iii) a mouth, or (iv) one or more ears.

12. The one or more computer-readable storage media according to claim 10, before comparing the first three-dimensional depth image with the pre-generated second three-dimensional depth image corresponding to the face image, the method further comprises:

generating the second three-dimensional depth image based on a region of the face image located within the second bounding box.

13. The one or more computer-readable storage media according to claim 12, wherein generating the second three-dimensional depth image comprises:

generating a binary rectangular mask based on the first bounding box;

calculating a second position of the binary rectangular mask in the second three-dimensional depth image based on the first position of the first bounding box in the face image; and processing the second three-dimensional depth image with the binary rectangular mask based on the second position.

14. The one or more computer-readable storage media according to claim 13, wherein processing the second three-dimensional depth image with the binary rectangular mask comprises:

setting area covered by the binary rectangular mask in the second three-dimensional depth image to 1, and setting area uncovered by the binary rectangular mask in the second three-dimensional depth image to 0.

15. A device comprising a memory and a processor, the memory storing one or more instructions that, once executed by the processor, cause the processor to perform operations, the operations comprising:

determining a first bounding box for a face image based on a recognition result predicted for the face image, generating a square bounding box from the first bounding box as a third bounding box such that the square bounding box has the same length as a short side of the first bounding box, expanding the square bounding box based on a predetermined expansion ratio to generate a second bounding box, extracting facial features from a region of the face image bounded by the second bounding box;

calculating an anti-spoofing analysis result of the face image in a predetermined manner based on the facial features of the face image;

performing a feature visualization process on the facial features of the face image to obtain a first three-dimensional depth image;

determining a comparison result by comparing the first three-dimensional depth image with a pre-generated second three-dimensional depth image corresponding to the face image; and adjusting the anti-spoofing analysis result based on the comparison result, and determining whether or not the face image is from a living body according to the adjusted anti-spoofing analysis result.

16. The device according to claim 15, before extracting the facial features from the face image, the method further comprises:

generating the recognition result by performing face recognition on the face image; and generating the first bounding box in the face image according to the recognition result.

17. The device according to claim 16, wherein the first bounding box consists of features that comprise one or more of (i) one or more eyes, (ii) a nose, (iii) a mouth, or (iv) one or more ears.

18. The device according to claim 16, before comparing the first three-dimensional depth image with the pre-generated second three-dimensional depth image corresponding to the face image, the method further comprises:

generating the second three-dimensional depth image based on a region of the face image located within the second bounding box.

19. The device according to claim 18, wherein generating the second three-dimensional depth image comprises:

generating a binary rectangular mask based on the first bounding box;

calculating a second position of the binary rectangular mask in the second three-dimensional depth image based on the first position of the first bounding box in the face image; and processing the second three-dimensional depth image with the binary rectangular mask based on the second position.

20. The device according to claim 19, wherein processing the second three-dimensional depth image with the binary rectangular mask comprises:

setting area covered by the binary rectangular mask in the second three-dimensional depth image to 1, and setting area uncovered by the binary rectangular mask in the second three-dimensional depth image to 0.

* * * * *